United States Patent
Galep et al.

(10) Patent No.: US 11,711,579 B1
(45) Date of Patent: Jul. 25, 2023

(54) NAVIGATION INTEGRATED CONTENT STREAM

(71) Applicant: Amazon Technologies, Inc., Seattle, WA (US)

(72) Inventors: Jason Adrian Galep, Seattle, WA (US); Scott Michael Collins, Seattle, WA (US); Kelly Bork, Seattle, WA (US); Jack Patrick Copeland, Clyde Hill, WA (US); Jeremiah Morgan, Seattle, WA (US); Paul A. Kotas, Seattle, WA (US); Sweta Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/157,033

(22) Filed: Jan. 25, 2021

(51) Int. Cl.
*H04N 21/462* (2011.01)
*H04N 21/478* (2011.01)
*H04N 21/472* (2011.01)
*H04N 21/845* (2011.01)

(52) U.S. Cl.
CPC ... *H04N 21/4622* (2013.01); *H04N 21/47211* (2013.01); *H04N 21/47815* (2013.01); *H04N 21/8456* (2013.01)

(58) Field of Classification Search
CPC ......... H04N 21/4622; H04N 21/47211; H04N 21/47815; H04N 21/8456
See application file for complete search history.

(56) References Cited

U.S. PATENT DOCUMENTS

| | | | |
|---|---|---|---|
| 9,961,380 B1* | 5/2018 | Hwang | H04N 21/25891 |
| 10,504,277 B1* | 12/2019 | Haitani | H04N 7/147 |
| 10,779,046 B1* | 9/2020 | Wu | H04N 21/4725 |
| 2007/0204285 A1* | 8/2007 | Louw | H04N 21/47815 |
| | | | 725/14 |
| 2009/0204990 A1* | 8/2009 | Xiong | H04N 21/4333 |
| | | | 725/38 |
| 2010/0262987 A1* | 10/2010 | Imanilov | H04N 21/4622 |
| | | | 725/35 |
| 2013/0060911 A1* | 3/2013 | Nagaraj | H04L 65/612 |
| | | | 709/219 |
| 2016/0054985 A1* | 2/2016 | Cragun | G06F 11/36 |
| | | | 715/762 |

(Continued)

*Primary Examiner* — Adil Ocak
(74) *Attorney, Agent, or Firm* — Kilpatrick Townsend & Stockton LLP

(57) ABSTRACT

Techniques for generating an interactive and dynamically updated content stream are described herein. Data assets that correspond to video segments provided by a plurality of content providers may be maintained. A video segment may correspond to a first portion of a full video segment for a piece of content from the plurality of content providers. A content stream may be generated that includes video segments provided by the plurality of content providers based at least in part on the data assets. The content stream may be presented via an application. Second input may be received via the application during presentation of the content stream that corresponds to a navigation command for displaying different content. The content stream may be updated to at least one of removing certain video segments or adding new video segments to the content stream based at least in part on the second input.

18 Claims, 11 Drawing Sheets

(56) References Cited

U.S. PATENT DOCUMENTS

| | | | |
|---|---|---|---|
| 2016/0070962 A1* | 3/2016 | Shetty | G06K 9/00718 |
| | | | 382/225 |
| 2016/0301972 A1* | 10/2016 | Liu | H04N 21/44008 |
| 2018/0167435 A1* | 6/2018 | Kinarti | G06F 5/00 |
| 2021/0120311 A1* | 4/2021 | Haberman | H04N 21/47202 |

* cited by examiner

NAVIGATION INTEGRATED CONTENT STREAM

BACKGROUND

Streaming content providers can enable users to explore, interact with, and consume a variety of digital media (e.g., movies, TV series, documentaries, music, live video game streaming content, etc.), and thereby enjoy a plethora of content from the comfort of their own homes or while on the move. Users may be inundated with such a large variety of choices between media titles, which may result in frustration and wasted time as a user browses or searches for content to watch. Conventional streaming content providers may provide static or generic recommendations to users as they interact with a streaming platform. However, these recommendations may not be personalized to the user and may add to a user's frustration. The generic recommendations may serve as something else the user must browse in order to find the content for which they are looking.

BRIEF DESCRIPTION OF THE DRAWINGS

Various embodiments in accordance with the present disclosure will be described with reference to the drawings, in which.

DETAILED DESCRIPTION

Figure 1:
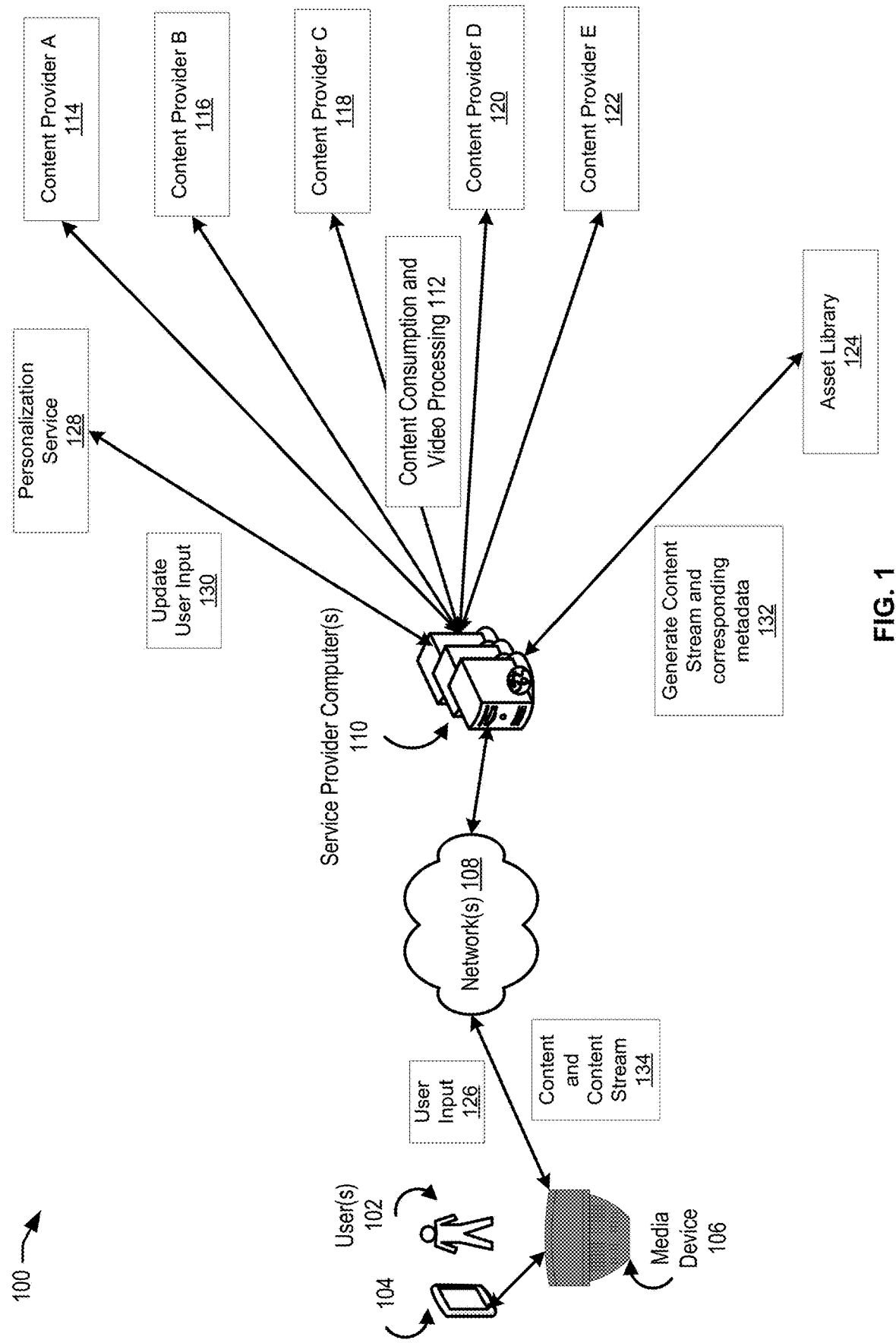
FIG. 1 illustrates an architecture for a content stream generation feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable medium for implementing a content stream generation feature for generating a content stream configured to present video segments that correspond to content provided by a plurality of content providers from various platforms. In embodiments, a user may launch an application by interacting with a user interface of a computer system. Service provider computers implementing the content stream generation features described herein may maintain and implement the application which serves as an ingress to begin presentation of the content stream. The content stream may be comprised of a plurality of video segments where each video segment corresponds to a short clip or portion of a piece of content. For example, a video segment may include a 60 second clip of a trailer for a movie. In some examples, the trailer may already by only a portion of the main content (e.g., of a movie), and the video segment may be only a portion of the trailer (thus, a segment of a segment). The application and user interface may provide information regarding navigation commands that can be used by a user to interact with the content stream. For example, a user may utilize an input/output device of a computer system to provide input that corresponds to a navigation command to skip the currently presented video segment and begin presentation of another video segment for another piece of content. In accordance with at least one embodiment, the content stream may source content from a plurality of content providers and thereby serve as an interactive hub for exploring the content offered by the plurality of content providers. In embodiments, the content stream may also be dynamically updated as the user interacts with the content stream by providing input. For example, input that corresponds to navigation commands to skip video segments, re-watch video segments, find more information for a video segment, or seamlessly begin consuming the associated piece of content may be used as data points for updating the content stream. The service provider computers implementing the content stream generation features described herein may use the data points or engagement data of users to dynamically update the content stream by removing certain video segments from the content stream and/or adding new video segments to the content stream.

As a non-limiting example, a user may use a controller of a television to provide input which corresponds to launching the application of the content stream generation feature implemented by the service provider computers. In response to the input, the application may begin presentation of a generated content stream that includes video segments for content provided by a plurality of content providers. The content stream may present each video segment of the content stream as well as information which guides a user to provide navigation commands to interact with the content stream. The video segments may include short clips of movie trailers, advertisements, recommendations for items or services, clips of live streaming content, news reports, and television series. A user may utilize the controller to provide input which corresponds to the navigation commands. For example, each video segment may only present a 60 second clip of the associated content. An example navigation command may instruct the user that if they desire to view more of the content, press up to watch the reminder of the video segment. Upon receiving such input, the application may update to present the full portion of the video segment (i.e., an entire movie trailer as opposed to just the 60 second clip previously presented via the content stream). Further navigation commands may be provided while presenting the full portion of the video segment. For example, a navigation command may be presented so that a user may view the entire piece of content associated with the video segment, in this case a corresponding movie. In response to receiving such input the application may seamlessly launch into presenting the movie for the user to view.

In accordance with at least one embodiment, a video segment may correspond to a portion of a full video segment for a piece of content. A video segment may include a portion that is less than a full video segment for the piece of content. As an example, a video segment may include a 60 second clip which corresponds to a movie trailer (full video segment) for a piece of content (movie). In embodiments, during presentation of the content stream, the user may provide input which corresponds to navigation commands and interact with the content stream to be presented with other video segments, an associated full video segment, as well as the piece of content in the entirety. Although the examples described so far have included digital media such as movies or television other content may be presented via the content stream and users may interact with the content stream to perform actions such as adding an item of an advertisement to a shopping list, a wish list, or order the item directly. In accordance with at least one embodiment, the service provider computers implementing the content stream generation features may be configured to determine if a user has permissions to consume a piece of content associated with a video segment. For example, a user may provide input which indicates a desire to view more than just a video segment for a movie. However, the movie may be offered by a content provider that the user does not currently subscribe to, pay for, etc. In such cases, the application may be updated to provide options for the user to rent, buy, or subscribe to various content platforms or content providers and view the content.

In embodiments, the service provider computer implementing the content stream generation features may generate and transmit information such as hyperlinks, web pages, or other information to a user device in response to receiving input which corresponds to a navigation command presented via the content stream. For example, a user may provide input during presentation of an advertisement to learn more information about an item included in the advertisement or purchase said item. In response to receiving the input the service provider computers may generate a link, a hyperlink, a web page, or other user interface object and transmit the information to a user device associated with a user. The information may be configured to redirect the user device to a web page or user interface to learn more about an item or service or purchase the item or service. In embodiments, the service provider computers may be configured to maintain data assets which include the video segments as well as the content associated with the video segments. The data assets may include metadata and other information which identifies a content source (content provider), an associated application for viewing the content, whether permissions are granted for such content for a given user, as well as mapping between the video segments and the content. In accordance with at least one embodiment, the service provider computers may be configured to generate the content stream based on ratings associated with each data asset and/or video segment and content. For example, users while viewing the video segments or content may provide input which indicates a rating for the video segment or content.

Engagement data from content providers on other platforms may also be used to rate or weight content and video segments for inclusion in a content stream. Lower rating content and video segments may be removed from a content stream while new video segments and associated content may be added to a content stream to ensure a dynamic viewing experience. Video segments with similar characteristics or ratings as those video segments which are skipped by a user may be removed dynamically from the content stream and replaced with new video segments. In accordance with at least one embodiment, a user may specify user preferences which indicate content types or content platforms they are interested in and content types or platforms which they are not interested in viewing. The service provider computers may utilize the user preferences specified by the user when generating a content stream for said user. In some examples, service provider computers that implement the content stream generation features may identify content, generate scores or ratings for the content, rank the content using the associated scores or ratings, and generate the content stream based on the ranked content. The content stream (e.g., generated data object) may include a combination of video segments from the ranked set of content such that a user is presented with a combination of clips or portions of content of video segments associated with various content offered by a plurality of content providers. The content stream can be presented in an automated fashion such that the user can explore content which they are interested in during a viewing session. The content stream can be updated based on a user's inferred intent and be guided by the service provider computers to content which they may be interested in viewing or consuming during the session or items they may wish to purchase. A user can interact with the content stream at any point during the presentation of the content stream to view different view segments, content associated with a video segment, or purchase an item or service associated with a video segment. Users can find out more information about a piece of content associated with a video segment or continue to let the content stream present video segments. The interactions or input provided by the user with the content stream may serve as additional information that can be used to further optimize subsequently generated content streams for the user and other users as well as dynamically update the content stream for a current viewing session.

In accordance with at least one embodiment, users may save or store video segments to computer systems for later viewing. The service provider computers implementing the content stream generation feature may be configured to integrate pre-moderated user generated content to video segments. For example, video reviews of items offered by an online merchant may be included as a video segment in a content stream for a given user. In embodiments, the service provider computers may be configured to integrate content captured by users via other platforms or devices, such as screen shots, videos, or pictures of media captured by user devices into video segments of content streams. In embodiments, a user may provide input which corresponds to a navigation command for sharing content, such as a video segment, to a social media platform. Users may also generate video segments and upload the video segments to the service provider computers for inclusion in subsequently generated content streams. Systems and methods described herein provide advantages over conventional streaming content. Conventional streaming content can offer a variety of content but with no insight into a viewer's preference resulting in a user spending more time exploring content than consuming content. Moreover, users may remain paralyzed at the amount of choice provided by content providers or lack the information to make a proper viewing choice as the user is unaware of the totality of offerings from a given content provider. The content streaming generation features described herein provide solutions to such problems by offering an interactive and dynamic content stream that helps a user explore content offered by a plurality of content providers. The content stream is dynamically updated as the user provides input to navigate between presented video segments. As users watch certain types of content longer or request more information about certain types of content the content stream updates to present similar types of content. Users are provided with an engaging content experience as they are able to launch into purchasing products or viewing content from the content stream.

FIG. 1 illustrates an architecture for a content stream generation feature, in accordance with at least one embodiment. The architecture 100 of FIG. 1 includes a user 102, a controller 104, a media device 106, networks 108, and service provider computers 110. As described herein, a user 102 may utilize a controller 104, to interact with a user interface presented by the media device 106 to launch an application associated with the content stream generation feature and implemented by the service provider computers 110. In response to the initial input the application may launch and present a generated content stream. In accordance with at least one embodiment, the user 102 may launch the application by providing audio input which is captured and interpreted by a speech to text device (not pictured) associated with the media device 106 or integrated as a component of the media device 106. The user may also provide input via audio commands or gestures in addition or instead of interacting with the controller 104. In embodiments, the service provider computers 110 may be configured to consume and process video content 112 from a plurality of content providers 114-122. The service provider computers 110 may be configured to consume and process the video content 112 in an offline manner, periodically, or dynamically by communicating and transferring data between the service provider computers 110 and the content providers 114-122 via networks, such as network 108. A content provider, such as content provider B 116 may correspond to an advertiser that provides content such as advertisements or recommendations for products or services that may be integrated into a content stream.

In accordance with at least one embodiment, the content providers 114-122 may include content providers that are associated with the service provider computers 110 as well as content providers that are associated with third parties. The content provided by the content providers 114-122 may include movies, television series, live streaming content, live event content, music, advertisements, recommendations, and other suitable content. In embodiments, the service provider computers 110 may be configured to generate and maintain an asset library 124 which includes the content consumed and video processing 112 from the content providers 114-122. The service provider computers 110 may be configured to determine technical compatibility of content provided by content providers 114-122 when generating and maintaining the asset library 124. The service provider computers 110 may be configured to generate and maintain metadata and information of video segments or the data assets of the asset library 124. The metadata and information of the data assets may identify associations between video segments, content, and sources of the content such as the content providers 114-122. The metadata and information of the data assets may be used by the service provider computers 110 to generate links, hyperlinks, web pages, or other content that can be used as an ingress to shopping for items or services, purchasing items or services, or other products associated with content such as advertisements or recommendations.

The service provider computers 110 may maintain and update video based performance data (engagement data) for video segments and associated content of the asset library 124. The engagement data may include average view time, average completion rate, average double clicks (e.g., providing multiple navigation commands for a particular video segment). The service provider computers 110 may be configured to maintain, in the asset library 124, advertiser or brand sponsored content. The advertiser or brand sponsored content may be provided to users based on keywords and segments included in the engagement data. The engagement data of the asset library 124 may be derived from the user input 126 provided by users, such as user 102, using controllers 104, to provide input that corresponds to navigation commands during presentation of a content stream displayed by the media device 106. The engagement data of the asset library 124 may include engagement data from the content providers 114-122 based on user interactions on content provider specific platforms. The engagement data of the asset library 124 may include engagement data that is specific to a user, such as user 102, as well as aggregated data from a plurality of users interacting with presented content streams and content providers.

In accordance with at least one embodiment, the engagement data of the asset library 124 may be utilized by the service provider computers 110 to implement a personalization service 128. The service provider computers 110 may use the updated user input 130 provided by a given user 102 to update a content stream dynamically as the content stream is being presented to the user 102 via media device 106. In embodiments, the personalization service 128 may include one or more algorithms for using the engagement data to dynamically update the content stream as it is presented to a user by adding new video segments or removing video segments. The personalization service 128 may use the one or more algorithms and engagement data to generate content streams as well as personalize content streams for a given user for during subsequent viewing sessions. The one or more algorithms of the personalization service 128 may generate scores or ratings to associate with each data asset and video segment which indicates a relevant or interest to a given user. The scores or ratings may be used by the service provider computers 110 when generating a content stream. In accordance with at least one embodiment, the service provider computers 110 may be configured to remove a certain portion or percentage (e.g., 20%) of the lowest performing content from the asset library 124. The updating of the asset library 124 may be performed periodically or dynamically as engagement data and ratings are obtained and determined.

In accordance with at least one embodiment, the service provider computers 110 may be configured, along with the algorithms of the personalization service, to utilize engagement data and input provided by users to generate models for subsequently generating content streams, advertisements, and recommendations to present to a given user interacting with the content stream generation feature. For example, the algorithms may be trained as a user engages with the content stream by recording the types of content a user skips the most, the types of content a user skips the least, categories a user selects, and the types of content that have the highest input (e.g., single click/navigation command or double clicks/navigation commands). The one or more algorithms may use historical streaming behavior from content providers for a user to determine recommendations, advertisements, and specific video segments to select when generating a content stream for a user. In embodiments, the service provider computers 110 may generate a content stream and corresponding metadata 132 based on data assets included in the asset library 124 and information from the personalization service 128. As illustrated in FIG. 1, the service provider computers 110 may transmit the content stream and associated content 134 in response to receiving user input 126. For example, the user 102 may utilize controller 104 to provide user input 126 which corresponds to a navigation command to view the piece of content associated with a video segment that is presented as part of the content stream 132 and 134 displayed via media device 106.

The content stream 132 and 134 displayed via media device 106 may be presented in an automatic mode which presents the video segments of the content stream 132 and 134 as well as information about navigation commands that the user can utilize to interact with the content stream 132 and 134. The user 102 can interact at any time during presentation of the content stream 132 and 134 to skip a video segment, view a previously watched video segment, view related content, or learn more about a video segment (e.g., view the full portion of a video segment, learn more about an item, purchase an item, etc.). If the user 102 does not provide any input the content stream 132 and 134 continues to present video segments associated with content from the content providers 114-122 in an automated mode. In embodiments, the video segment may include any portion of content (e.g., a snippet, a clip, or an edited, but shorter, version of the entirety of a piece of content) that is of a duration that is less than the entire duration of the content. The video segment may be a portion of media associated with a piece of content that is generated by the author of the content or the content provider such as an official trailer associated with a movie or video game. The video segment may also include content that is generated by the service provider computers 110 that is different from content provider or author generated content. For example, the service provider computers 110 may generate a trailer for a movie that includes different scenes and is of a different duration than an official trailer for the same movie.

In accordance with at least one embodiment, the content stream 132 and 134 may include a data object that is generated by the service provider computers and includes one or more data assets that correspond to the video segments for content. The data assets of the content stream 132 and 134 may include pointers or references to pre-generated video segments or dynamically obtained video segments for content as well as information which specifies the duration to present each video segment (e.g., 60 seconds). In embodiments, the engagement data for a user may be maintained by the service provider computers in user profile associated with the user. The user profile may include preferences for content and video segments specified by the user as well as financial information for completing transactions initiated via the content stream and determining whether a specific user has permissions to view certain content included in the content stream. The permissions may be updated based on information from content providers offering the content which requires subscriptions or payment before the content can be consumed by a user. In accordance with at least one embodiment, the service provider computers 110 may generate and transmit instructions to media device 106 to launch other applications for consuming content associated with video segments that the user 102 interacted with via 104 by providing user input 126. In embodiments, the service provider computers 110 may provide metadata or information associated with the video segment to a content provider, such as content providers 114-122, to launch the application or to integrate the presentation of the piece of content for presentation via media device 106 from the content stream 132 and 134. The service provider computers 110 may use the metadata and information in a function call or an application programming invocation (API) provided by computer systems associated with content providers to integrate the presentation of a piece of content from the content stream 132 and 134 seamlessly.

Figure 2:
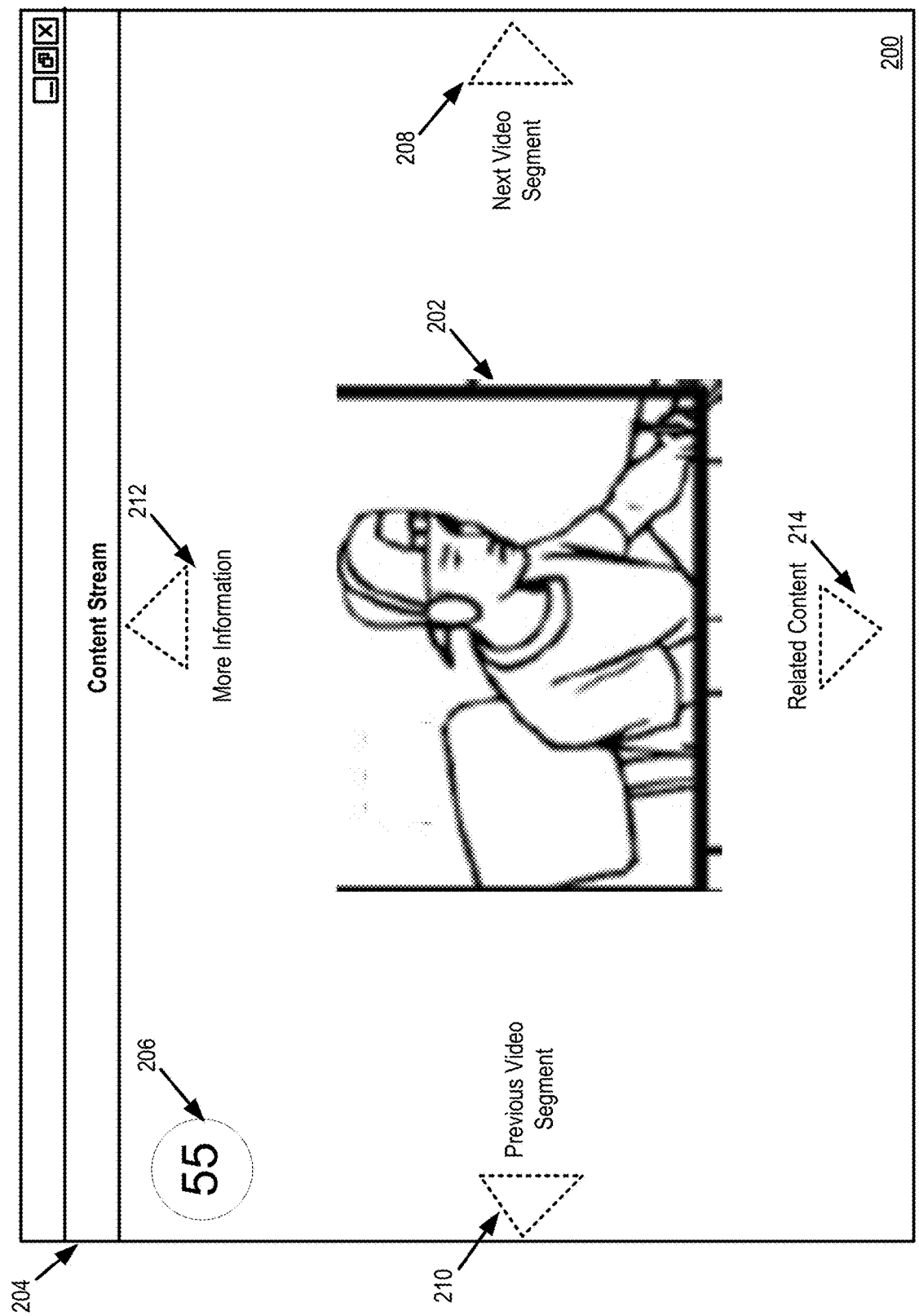
FIG. 2 illustrates an example user interface for a content stream generation feature, in accordance with at least one embodiment.

FIG. 2 illustrates an example user interface for a content stream generation feature, in accordance with at least one embodiment. FIG. 2 includes user interface 200 which may present an example video segment of a content stream for a content stream generation feature described herein. The user interface 200 of the video segment may include digital media 202 such as images, clips, movies, animations, etc., for a piece of content. As illustrated in FIG. 2, the user interface 200 is presented via a browser application 204, such as a web browser. However, the content stream generation features described herein do not need to be limited to such environments and may be presented via applications, either third party or native applications of a computer system (user device or media device). In accordance with at least one embodiment, the video segment presented via user interface 200 may include a duration indicator 206 which indicates the duration of time left before the currently presented video segment (e.g., digital media 202) will conclude and the next video segment will be presented from the content stream. The digital media 202 depicted in FIG. 2 may correspond to a live stream of a person playing a video game via a streaming platform. In embodiments, the duration indicator 206 may periodically present itself, persistently present itself, or fade as the video segment is presented and reappear as the video segment is close to concluding.

Depicted in the user interface 200 of FIG. 2 are one more indicators 208-214 which correspond to navigation commands for enabling a user to interact with the content stream. As illustrated in FIG. 2, indicator 208 may correspond to a navigation for viewing a next video segment of the content stream. A user may interact with indicator 208 by providing input via an associated input/output device of a computer system which causes the content stream to present the next video segment. A user may skip to the next video segment at any time during the duration of a currently presented video segment as indicated by the duration indicator 206. The service provider computers implementing the content stream generation features may utilize the user input to skip to a next video segment and to update the content stream dynamically. Another indicator, indicator 210 may correspond to a navigation command to view a previously presented video segment of a content stream.

Such input may indicate a positive engagement with the previously presented video segment by the service provider computers which may update the engagement data for the currently presented video segment as well as the engagement data for the previously presented video segment. This input of interacting with the navigation command that corresponds to indicator 210 may also be used to dynamically update the current content stream as well the user preferences or engagement data for a user. The indicator 212 may correspond to a navigation command to obtain more information for a currently presented video segment (e.g., information associated with digital media 202) such as viewing a full portion of a video segment, information for purchasing an item, adding the item to a shopping list or wish list, or retrieving information about an item. Information presented as well as further interactions with the content stream resulting from providing input to interact with the navigation command associated with indicator 212 are discussed in more detail below with reference to FIGS. 3 and 4. The user interface 200 also depicts indicator 214 for viewing related content of a currently presented video segment or of the content stream itself. The information presented as well as further interactions with the content stream resulting from providing input to interact with the navigation command associated with indicator 212 are discussed in more detail below with reference to FIG. 7. As described herein, the service provider computers may utilize the input of users interacting with the content stream to update an algorithm for generating subsequent content streams for subsequent viewing sessions or for viewing sessions of other users.

Figure 3:
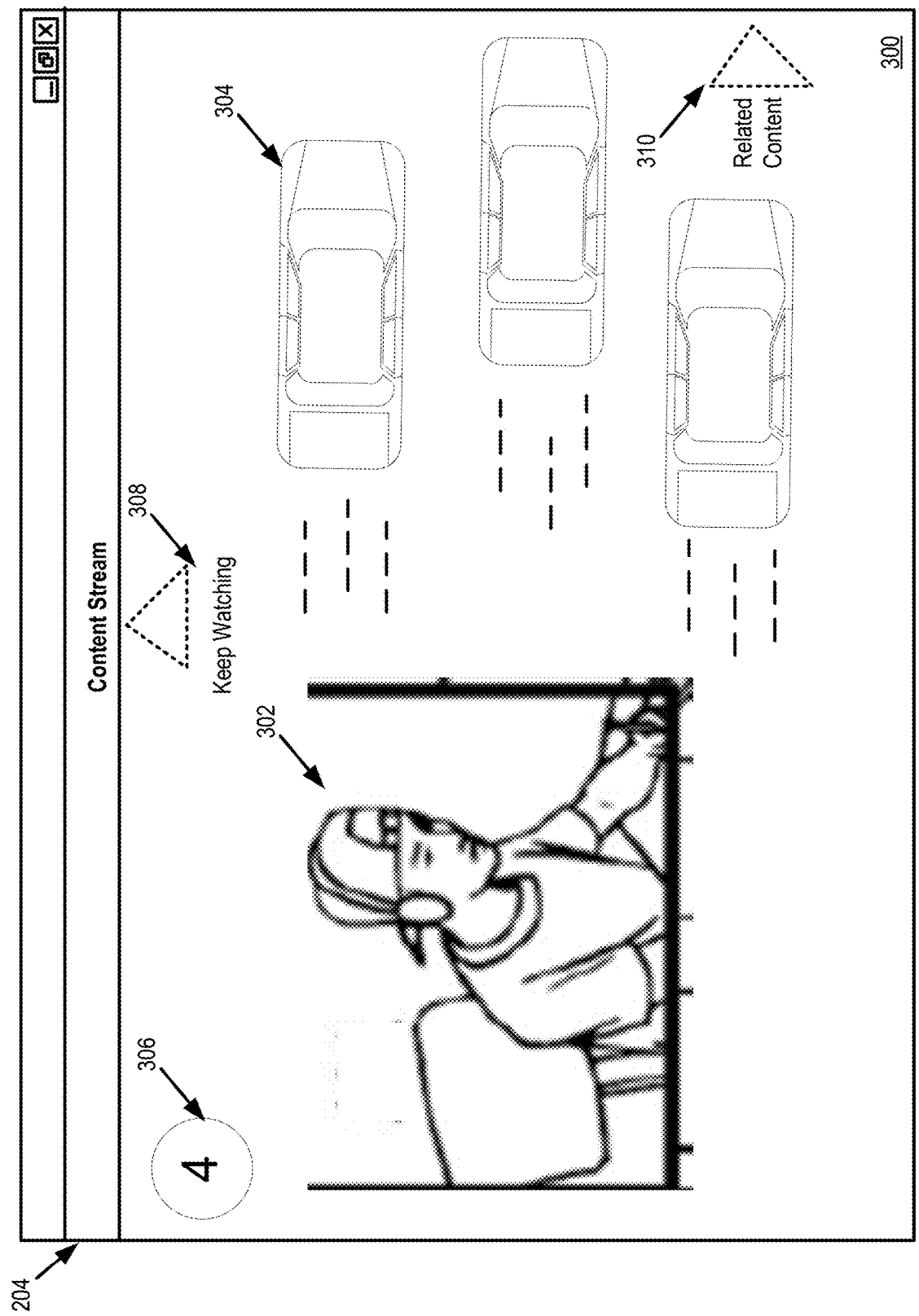
FIG. 3 illustrates an example user interface for a content stream generation feature, in accordance with at least one embodiment.

FIG. 3 illustrates an example user interface for a content stream generation feature, in accordance with at least one embodiment. FIG. 3 depicts user interface 300 which may be an updated version of user interface 200 of FIG. 2 in response to user input which corresponds to indicator 212. For example, a user may have provided input which corresponds to navigation command for viewing more information for digital media 202 of the content stream presented via user interface 200. As described herein, a user may interact with a content stream to update the application and/or user interface for viewing a full portion of a video segment (e.g., the entirety of a film trailer as opposed to the portion of the trailer that is presented as a video segment as part of the content stream). Upon receiving the input associated with indicator 212, the user interface 200 may be updated to present user interface 300 of FIG. 3 which includes more information related to the video segment or content associated with the video segment associated with the user input. In the current example, the user interface 300 is updated to present the person 302 as well as the video game 304 they are live streaming via a streaming platform.

Figure 4:
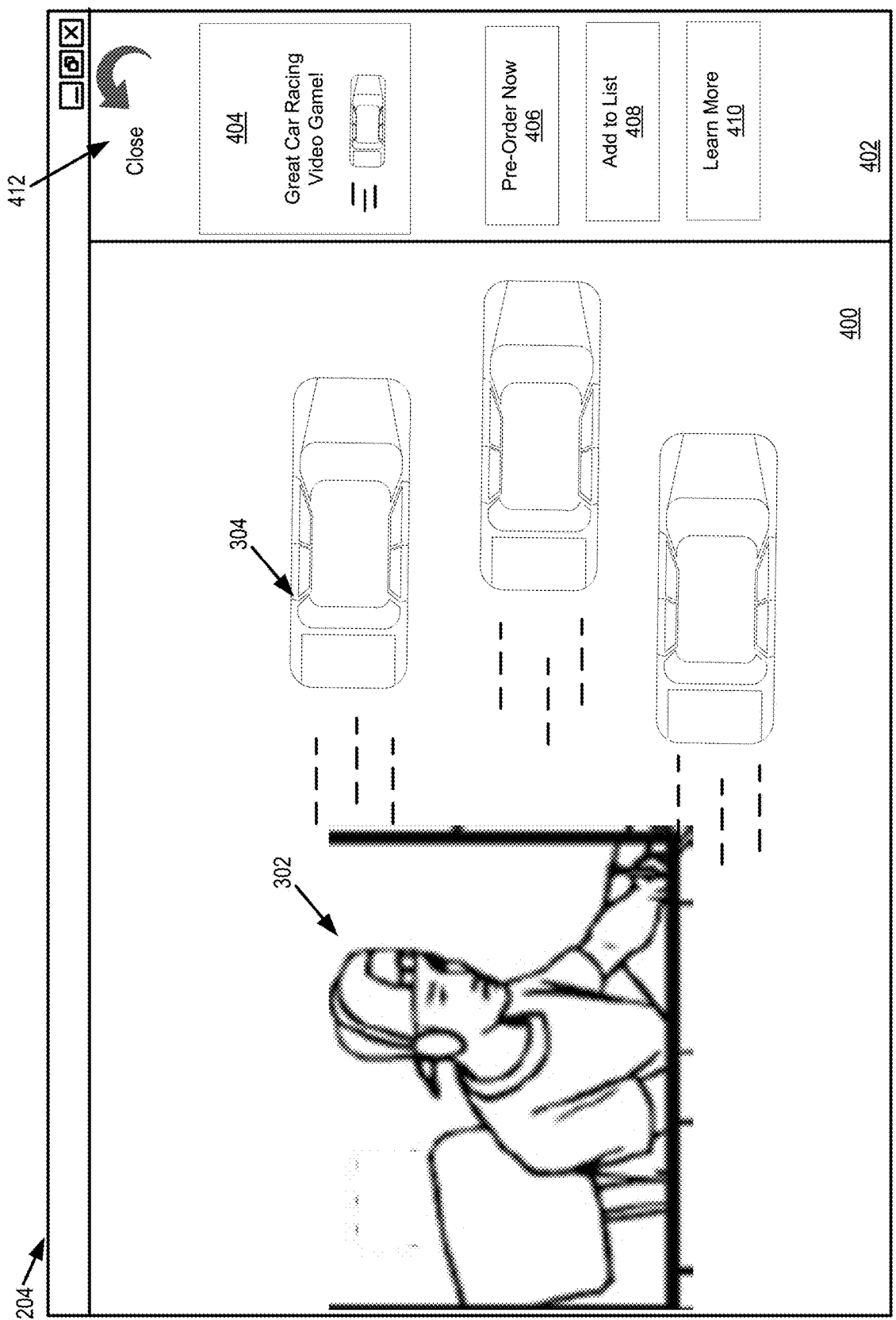
FIG. 4 illustrates an example user interface for a content stream generation feature, in accordance with at least one embodiment.

The user interface 300 of FIG. 3 depicts a duration indicator 306 which displays an amount of time until the full video segment concludes. In embodiments, the full video segment may be a portion of a piece of content that is a duration that is less than the entire duration of the piece of content but more than the first portion of the video content presented via the content stream. In cases where the user does not provide further input by the conclusion of the full video segment, such as by providing input which corresponds to a navigation command associated with indicator 308, the user interface 300 may be updated to present the next video segment of the content stream for a current viewing session. The indicator 308 may correspond to a navigation command to keep watching, e.g., view the entirety of the piece of content or obtain more information about an item or service associated with a video segment (as illustrated in FIG. 4). The user interface 300 depicts indicator 310 which corresponds to a navigation command for viewing related content to the content being displayed in user interface 300. For example, the content displayed in FIG. 3 corresponds to live streaming video game content. In response to receiving user input for a navigation command associated with indicator 310, the user interface 300 may update to present content related to live streaming video game content. The input may be used as engagement data to update the user profile for the user, the content stream, and video segments maintained in an asset library.

FIG. 4 illustrates an example user interface for a content stream generation feature, in accordance with at least one embodiment. FIG. 4 depicts user interface 400 which may be an updated version of user interface 300 of FIG. 3 in response to user input which corresponds to indicator 308. For example, a user may have provided input which corresponds to navigation command for viewing more information for digital media 302 and 304 of the content stream presented via user interface 300. As described herein, a user may interact with a content stream to update the application and/or user interface for viewing a full portion of a video segment (e.g., the entirety of a film trailer as opposed to the portion of the trailer that is presented as a video segment as part of the content stream) as well as view information for accessing the associated content. For example, the information may include options for buying a product associated with the content or video segment. Upon receiving the input associated with indicator 308, the user interface 300 may be updated to present user interface 400 of FIG. 4 which includes more information related to the video segment or content associated with the video segment associated with the user input. In the current example, the user interface 400 is updated to present the person 302, the video game 304 they are live streaming via a streaming platform, and more information 402 for the video game 304.

The user interface 400 of FIG. 4 depicts information 402 for the content (302 and 304) of the content stream. For example, user interface 400 depicts details for an item 404, options to purchase or pre-order 406 the item 404, add 408 the item 404 to a list, or learn more information 410 for the item 404. The user interface 400 also includes an indicator 412 for closing the information 402 tab of the content stream presented via user interface 400. In response to such input (e.g., interacting with the indicator 412), the content stream may continue to present the live streaming content 302 and 304 or present the next video segment of the content stream. The user interface 400 may present information about item 404 such as a title, reviews, price, and delivery details. The option 406 may correspond to a pre-order or purchase option for the item 404 that is associated with the video segment or content 302 and 304. Upon a user interacting with option 406 the application may be configured to purchase the item, or generate and transmit information to a user device of a user for completing a transaction, such as a hyperlink to a web site for purchasing the item. In response to a user interacting with option 408 the application may be configured to update information of a user profile to associate the item 404 with a wish list, shopping list, or shopping cart of the user profile. Upon receiving input that corresponds to option 410, the user interface 400 may be configured to present more information about item 404 including more item details or to cause the application to provide information for updating a web page for presentation on a user device associated with the user. The information may include links or hyperlinks to web pages which will direct the user device to more information for item 404.

Figure 5:
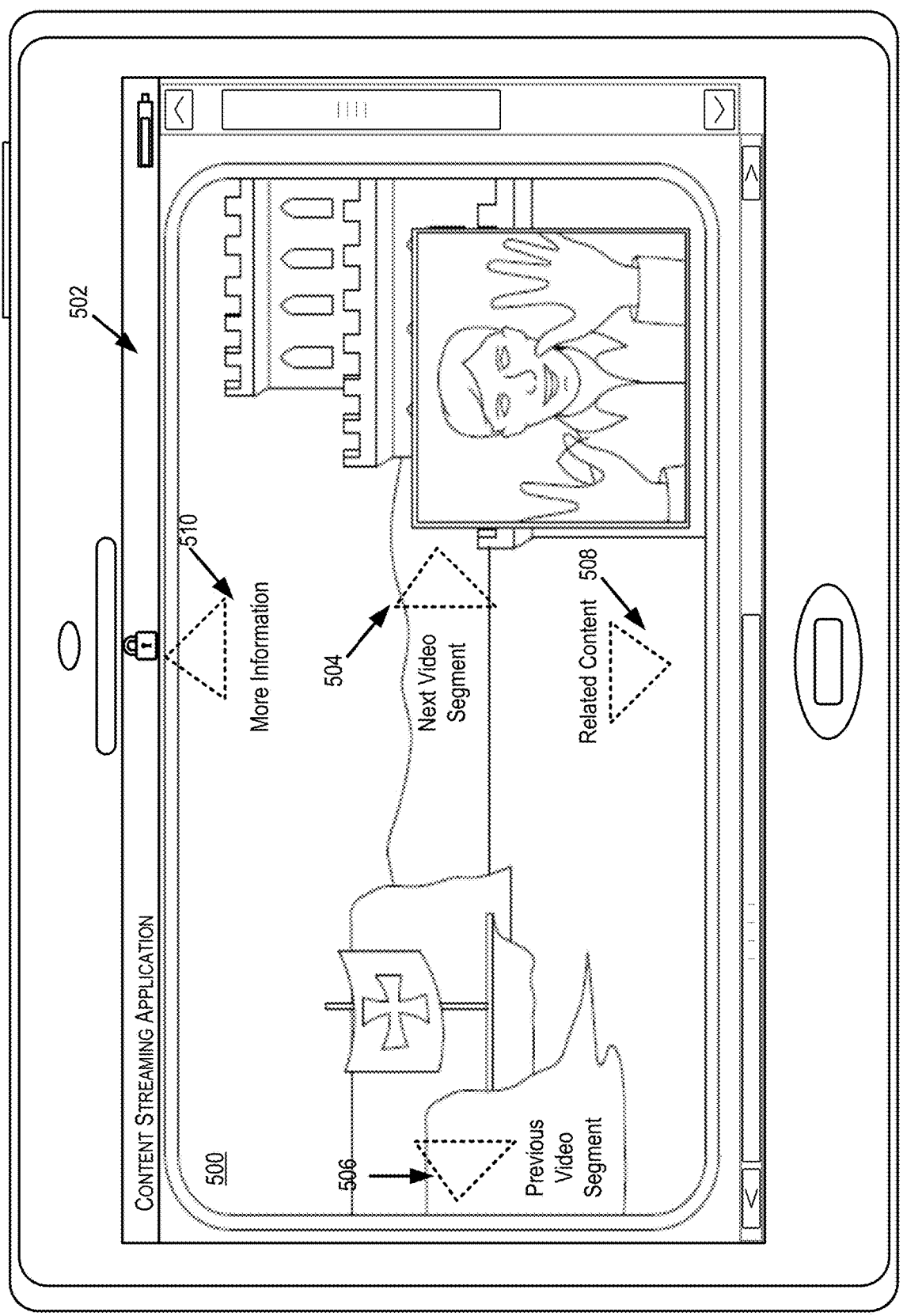
FIG. 5 illustrates an example user interface for a content stream generation feature, in accordance with at least one embodiment.

FIG. 5 illustrates an example user interface for a content stream generation feature, in accordance with at least one embodiment. FIG. 5 includes user interface 500 which may present an example video segment of a content stream for a content stream generation feature described herein. The user interface 500 of the video segment may include digital media such as a portion of an animated movie. As illustrated in FIG. 5, the user interface 500 is presented via an application 502, such as an application associated with the content streaming generation feature described herein. However, the content stream generation features described herein do not need to be limited to such environments and may be presented via browsers such as web browsers of a computer system (user device or media device). In accordance with at least one embodiment, the video segment presented via user interface 500 may include a duration indicator (not pictured) which indicates the duration of time left before the currently presented video segment (e.g., animated movie) will conclude and the next video segment will be presented from the content stream.

Depicted in the user interface 500 of FIG. 5 are one more indicators 504-510 which correspond to navigation commands for enabling a user to interact with the content stream. As illustrated in FIG. 5, indicator 504 may correspond to a navigation for viewing a next video segment of the content stream. A user may interact with indicator 504 by providing input via an associated input/output device of a computer system which causes the content stream to present the next video segment. A user may skip to the next video segment at any time during the duration of a currently presented video segment. The service provider computers implementing the content stream generation features may utilize the user input to skip to a next video segment and to update the content stream dynamically. Another indicator, indicator 506 may correspond to a navigation command to view a previously presented video segment of a content stream. The indicator 508 may correspond to a navigation command to view related content to the currently presented video segment as will be discussed in further detail in FIG. 7. The indicator 510 may correspond to more information for the video segment presented via user interface 500 as is discussed below with reference to FIG. 6.

Figure 6:
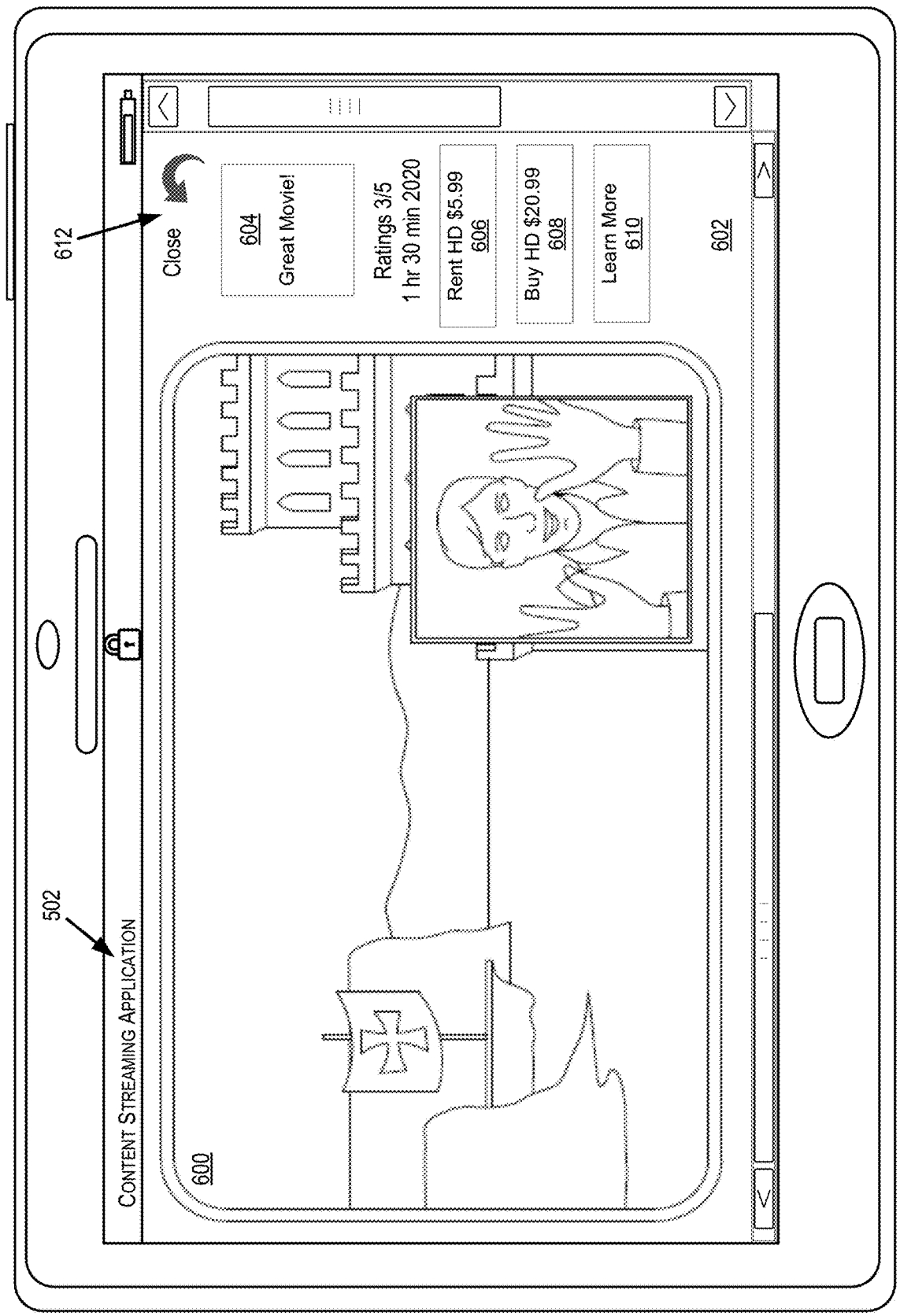
FIG. 6 illustrates an example user interface for a content stream generation feature, in accordance with at least one embodiment.

FIG. 6 illustrates an example user interface for a content stream generation feature, in accordance with at least one embodiment. User interface 600 of FIG. 6 may correspond to an updated user interface 500 of FIG. 5 in response to input that is associated with a navigation command for more information. As described herein, a user may have or not have certain permissions required to view and consume content previewed by the video segments of the content stream. In cases where a user is not entitled or lacks the credentials/permissions to view content associated with a video segment of the content stream they may be presented with options as illustrated in user interface 600. For example, user interface 600 includes options 602 which includes information 604 about the content (e.g., ratings, duration), as well as options for renting 606 or buying 608 the content. Option 610 may provide more information about the content such as a content source or application associated with the content and/or content source.

The options 602 presented via user interface 600 may be utilized by a user to grant permission or credentials necessary to view the entirety of the piece of content beyond the video segment presented via the content stream for the current viewing session. For example, by renting 606 or buying 608 the content the user may be granted permission and flags associated with their user profile may be updated to indicate such permissions. Upon renting 606 or purchasing 608 the content the user interface 600 may be updated to integrate presentation of the content directly. In cases where the content is provided by a content provider specific application the user interface may be updated to launch the appropriate application and content based on information provided by the service provider computers such as the metadata and information associated with a video segment. The user interface 600 also includes an indicator 612 for closing the options 602. Upon receiving input that corresponds to an interaction or navigation command with indicator 612, the user interface 600 may be updated to continue presentation of the full video segment or present the next video segment of the content stream. Users may also be presented (not pictured) with indicators for navigation commands for sharing the video segment presented via user interface 600 as well as saving the video segment presented via user interface 600. In response to input that corresponds to such navigation commands the service provider computer may use information from an associated user profile to identify appropriate social media platforms as well as available devices or locations to store the video segments. Users may also interact with a user interface of the application associated with the content stream generation feature to provide video segments or content for inclusion in subsequently generated content streams.

Figure 7:
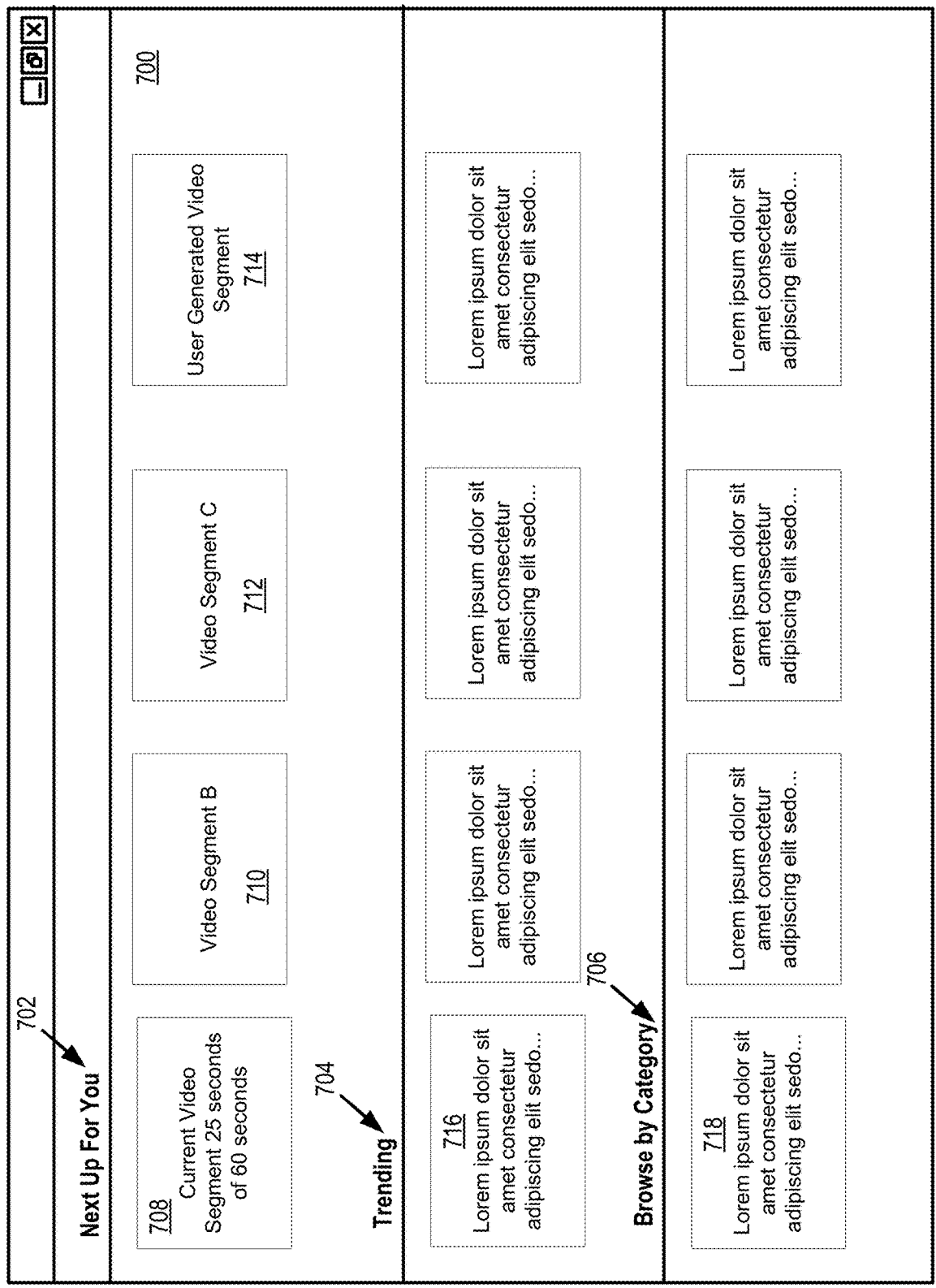
FIG. 7 illustrates an example user interface for a content stream generation feature, in accordance with at least one embodiment.

FIG. 7 illustrates an example user interface for a content stream generation feature, in accordance with at least one embodiment. User interface 700 of FIG. 7 may be presented via an application or browser in response to receiving input that corresponds to a navigation command of indicator 214 of FIG. 2 or 508 of FIG. 5 (related content). Users may be presented with several UI objects which correspond to related content of a currently presented video segment or of content associated with the content stream generation features implemented by the service provider computers. For example, FIG. 7 depicts several content options 702, 704, and 706. Content option 702 may provide information and visual previews of video segments that are yet to be presented in the content stream of the current viewing session. For example, FIG. 7 depicts UI objects for video segments 708-712. A user may interact with UI objects 708-712 to skip directly to a certain video segment of the generated content stream. The UI object 708 also displays information for a video segment such as the duration left for a currently viewed video segment. Input provided via user interface 700, such as interacting with UI objects 708-712, may be used as data or information for updating algorithms which are used to generate content streams, update preferences for a user profile, and dynamically update the current content stream. Content option 702 includes UI object 714 which corresponds to a user generated video segment. A user generated video segment 714 may include content generated by the user, such as from clips or video segments saved, liked, or clipped during a previous viewing session. The user generated video segment 714 may also include content about the user, such as uploaded or obtained photos or movies. For example, the user generated video segment 714 may include an animated slide show that is comprised of photos of a user interacting with user interface 700. The media or content used to populate or generate the user generated video segment 714 may be obtained from a user profile associated with the user. In embodiments, a video segment of the video segments 708-712, can include video segments which correspond to advertisements or recommendations for digital or physical products or services offered by a merchant.

For example, by interacting with UI object 710 the algorithm may interpret the input as an indication to view content similar to the content of the video segment that corresponds to UI object 710. Video segments similar to the video segment associated with UI object 708 may be removed from the content stream and new video segments with content similar to the content associated with UI object 710 may be added to the content stream. Content option 704 may include information and previews for content that is trending or most popular among content providers according to engagement data aggregated from users or obtained from the content providers themselves. In response to a user interacting with UI object 716 the user interface 700 may be updated to begin presenting content that corresponds to the UI object 716.

For example, the user interface 700 may present a video segment that corresponds to the UI object 716 or seamlessly begin presentation of content associated with the UI object 716 if the user has the correct permissions or credentials. In cases where the content associated with UI object 716 is provided by a content specific platform application the service provider computers may provide instructions for launching the content specific platform application which causes an update to the user interface 700. The service provider computers may utilize an API of the content providers to launch the application and redirect the application directly to the content that corresponds to the UI object 716. The option 706 may present UI objects, such as UI object 718, which include content according to a category/content type. A user may interact with a UI object 718 to begin presentation of a video segment associated with the content category/content type. The input provided by a user which includes an interaction with UI object 718 may also be used as information or engagement data for updating the content stream or updating subsequent content streams generated for other users with similar engagement data, viewing histories, or user profiles.

Figure 8:
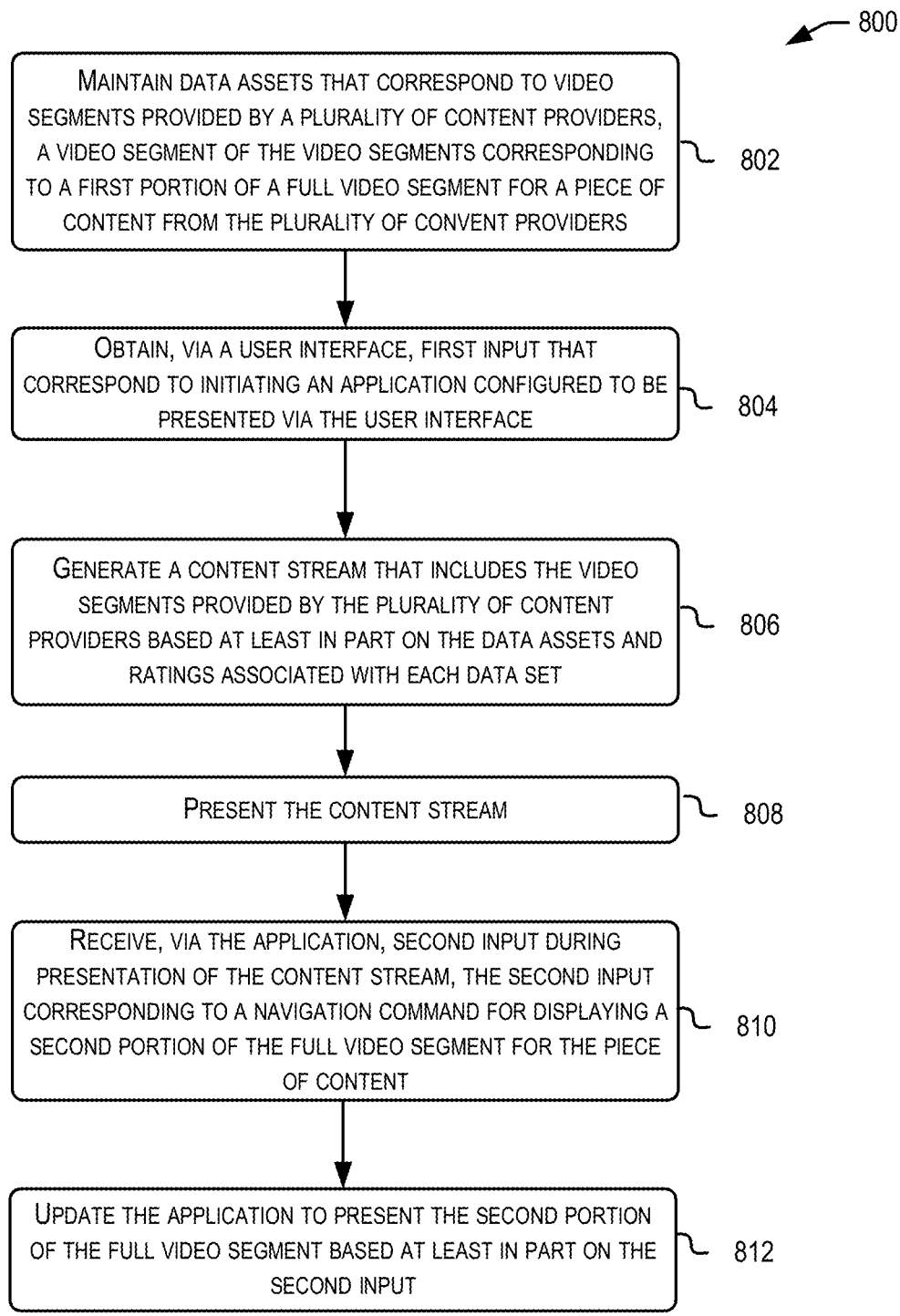
FIG. 8 illustrates an example flow chart for a content stream generation feature, in accordance with at least one embodiment.
Figure 9:
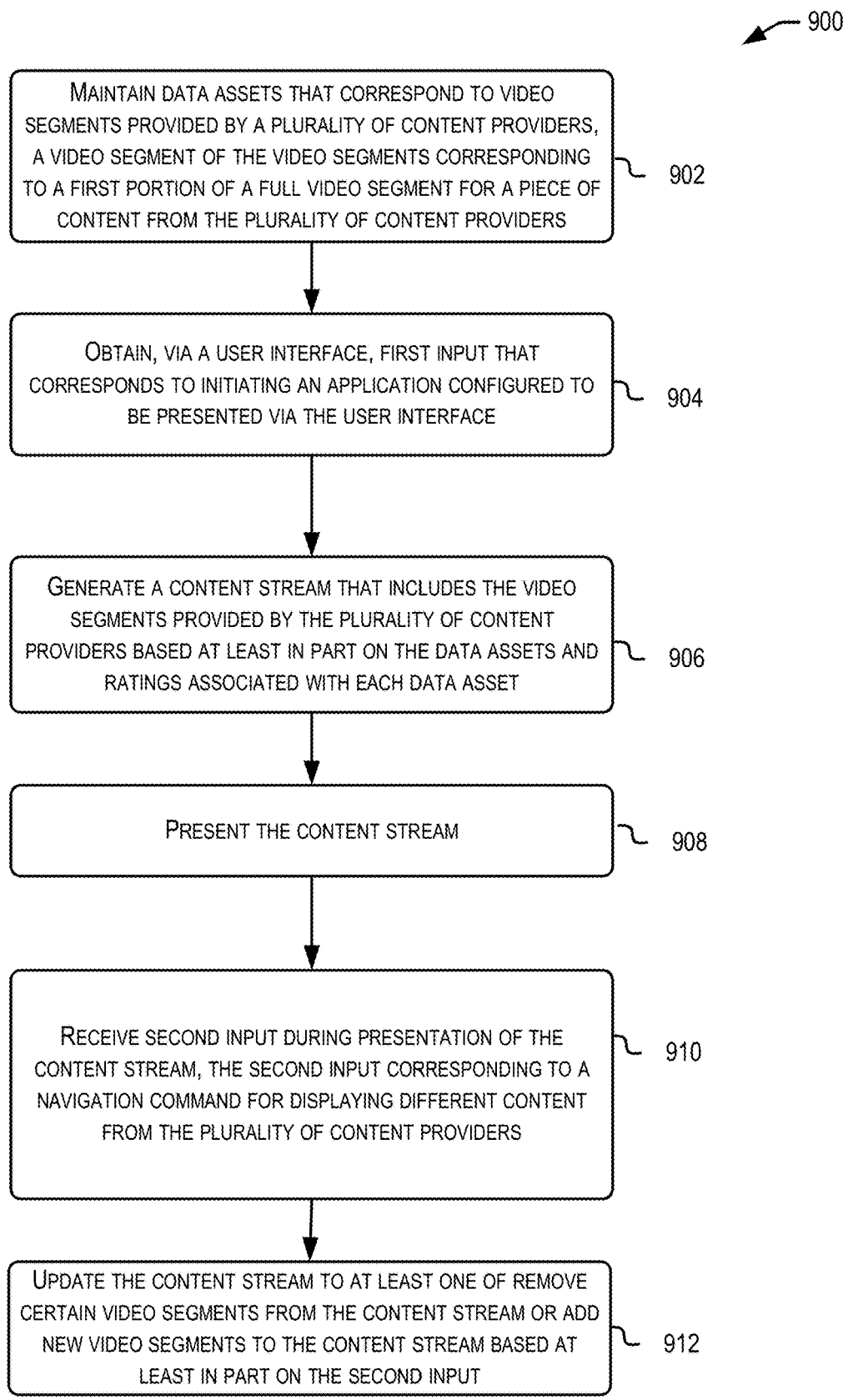
FIG. 9 illustrates an example flow chart for a content stream generation feature, in accordance with at least one embodiment.

FIGS. 8 and 9 illustrate example flow charts for content stream generation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 10:
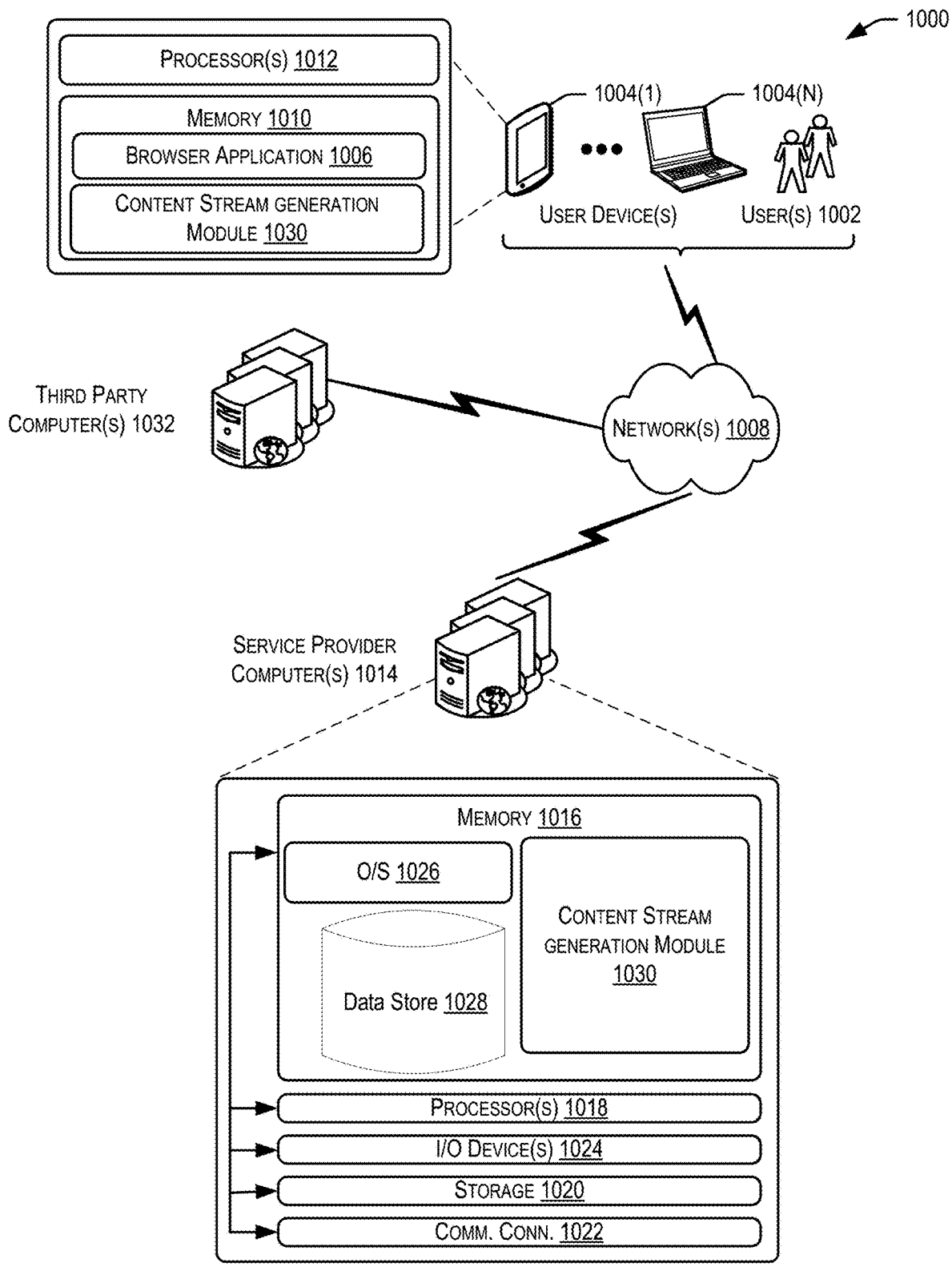
FIG. 10 illustrates an example architecture for implementing a content stream generation feature, in accordance with at least one embodiment.

In some examples, service provider computers (service provider computers 1014) utilizing at least the content stream generation module 1030 depicted in FIG. 10 may perform the processes 800 and 900 of FIGS. 8 and 9. In FIG. 8, the process 800 may include maintaining data assets that correspond to video segments provided by a plurality of content providers at 802. A video segment of the video segments may correspond to a first portion of a full video segment for a piece of content from the plurality of content providers. For example, a first portion of a full video segment may correspond to a short clip (60 seconds) where the full video segment corresponds to a trailer for a movie (piece of content) from a content provider. In embodiments, a data asset of the data assets may include metadata that identifies a relationship to the piece of content and information for the piece of content. For example, the metadata may include metadata and information which can be utilized by the service provider computers to identify a source for the piece of content (e.g., the content provider) as well as the piece of content itself (movie, television series, live stream, video game, item, or service). The metadata and information may be utilized by the service provider computers in a function call or application programming interface (API) invocation associated with an application of a content provider. For example, a request to launch a particular application associated with a content provider may include the metadata associated with the video segment. As the service provider computer launches the application it can be directed to a particular piece of content based on the metadata and information of the data asset and video segment.

The process 800 may include obtaining, via a user interface, first input that corresponds to initiating an application configured to be presented via the user interface at 804. In embodiments, a computer system (e.g., a user device) may present or display, via an associated user interface, a number of applications. An application may be associated with the content streaming features described herein. A user may utilize an input/output device or audio commands to initiate or launch the application associated with the content streaming feature. The process 800 may include generating a content stream that includes the video segments provided by the plurality of content providers based at least in part on the data assets and ratings associated with each data set at 806. In accordance with at least one embodiment, the content stream comprises a streamable presentation of each video segment. In embodiments, advertisements or recommendations for content, including items or services, may be integrated into the content stream. Users may provide input during presentation of the advertisements or recommendations to learn more information about associated items or services or to skip the advertisement or recommendation and view the next video segment of the content stream.

The process 800 may include presenting the content stream at 808. In embodiments, the content stream may be presented via the application. The application may be configured to display the content stream via the user interface of the computer system. The process 800 may include receiving, via the application second input during presentation of the content stream at 810. In embodiments, the second input may correspond to a navigation command for displaying a second portion of the full video segment for the piece of content. In accordance with at least one embodiment, a user may utilize an input/output device of a computer system, such as a controller, to provide navigation commands during presentation of the content stream via the application of the computer system. The application of the computer system may be configured to receive and interpret, or receive and transmit to the service provider computers for interpretation, the input and map the input to one or more navigation commands. For example, one input may correspond to a navigation command to skip the currently presented video segment to view the next video segment of the content stream while another input may correspond to a navigation command to view a previously presented video segment of the content stream. Other navigation commands are described with reference to FIGS. 2-7. The process 800 may include updating the application to present the second portion of the full video segment based at least in part on the second input at 812. For example, the input may correspond to a navigation command to view the full video segment as opposed to merely the first portion of the video segment displayed via the content stream. In embodiments, the application may be updated to present the full video segment seamlessly in response to the input.

The process 900 may include maintaining data assets that correspond to video segments provided by a plurality of content providers at 902. A video segment of the video segments may correspond to a first portion of a full video segment for a piece of content from the plurality of content providers. The process 900 may include obtaining, via a user interface, first input that corresponds to initiating an application configured to be presented via the user interface at 904. In embodiments, the first input may correspond to an audio command that is received and interpreted by a speech to text device associated with the computer system. The process 900 may include generating a content stream that includes the video segments provided by the plurality of content providers based at least in part on the data assets and ratings associated with each data asset at 906. The content stream comprises a streamable presentation of each video segment.

In accordance with at least one embodiment, the ratings associated with each data asset may be obtained and maintained by the service provider computers implementing the content stream generation features described herein. For example, the application may provide UI objects which a user may interact with to provide ratings for each video segment as it is displayed. The service provider computers may also interpret engagement data from the application to generate the ratings for each video segment. For example, if a user provides input for a navigation command to skip a certain video segment, the service provider computers may update the rating for the certain video segment to reflect a negative engagement. The service provider computers may also update the rating for a certain video segment to reflect a positive engagement if a user provides input for navigation commands to view a certain video segment multiple times or to view the full video segment or associated content. The process 900 may include presenting the content stream at 908. The process 900 may include receiving second input during presentation of the content stream via the application at 910. The second input may correspond to a navigation command for displaying different content from the plurality of content providers. For example, the navigation command may correspond to a skip function for skipping past a currently presented video segment for a piece of content to be presented with a different video segment that corresponds to a different piece of content provided by the plurality of content providers. In embodiments, the different content can include the piece of content or the full video segment that corresponds to the video segment.

The process 900 may include updating the content stream to at least one of remove certain video segments from the content stream or add new video segments to the content stream based at least in part on the second input at 912. In accordance with at least one embodiment, the content generation features implemented by the service provider computer may dynamically update the content stream as a user interacts with the content stream by providing input via the application. For example, skipping certain video segments as indicated by user input may be utilized as a data point to remove similar video segments from the content stream and add new video segments to the content stream that are not similar to the skipped video segments. In accordance with at least one embodiment, the content stream may be generated based on engagement data provided by content providers. For example, engagement data may include browse, viewing, rental, and purchase information from content providers on content provider platforms. In embodiments, users may provide input during presentation of the content stream to save certain video segments (either locally or remotely), share the video segments (such as via social media platforms), or generate their own video segments from saved video segments. The user generated video segments may be provided to the service provider computers for inclusion in subsequently generated content streams. In accordance with at least one embodiment, the service provider computers may generate the content stream based on user preferences indicated by a user profile associated with a user.

FIG. 10 illustrates an example architecture for implementing a content stream generation feature, in accordance with at least one embodiment. In architecture 1000, one or more users 1002 (e.g., customers, users, consumers, etc.,) may utilize user computing devices 1004(1)-(N) (collectively, user devices 1004) to access a browser application 1006 or a user interface (UI) accessible through the browser application 1006, via one or more networks 1008 to interact with an application associated with the content stream generation features described herein or an application associated with a content provider. The "browser application" 1006 can be any browser control or native application that can access and display a generated content stream, details for items or services, web pages with information about items or services, as well as content from content providers. The "browser application" 1006 may include a user interface of a native software application for enabling the browsing of applications associated with content providers as well as an application associated with the content stream generation feature as well as requesting content. A native software application may include an application or program that has been developed for use on a particular platform (such as an operating system) or a particular device (such as a particular type of mobile device or user device 1004). In embodiments, the user device 1004 may include one or more components for enabling the user 1002 to interact with the browser application 1006 such as an associated input/output device or controller (not pictured). For example, a user 1002 may provide navigation commands via a controller associated with the user device 1004 to browse applications via the browser application 1006 as well as provide navigation commands with an application, such as the application associated with the content stream generation feature.

The user devices 1004 may include at least one memory 1010 and one or more processing units or processor(s) 1012. The memory 1010 may store program instructions that are loadable and executable on the processor(s) 1012, as well as data generated during the execution of these programs. Depending on the configuration and type of the user devices 1004, the memory 1010 may be volatile (such as random access memory (RAM)) and/or non-volatile (such as read-only memory (ROM), flash memory, etc.). The user devices 1004 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1004. In some implementations, the memory 1010 may include multiple different types of memory, such as static random access memory (SRAM), dynamic random access memory (DRAM), or ROM.

Turning to the contents of the memory 1010 in more detail, the memory 1010 may include an operating system and one or more application programs or services for implementing the features disclosed herein. Additionally, the memory 1010 may include one or more modules for implementing the features described herein including the content stream generation module 1030. For example, the content stream generation module 1030 of the user device 1004 may be configured to obtain user input from user 1002 including navigation commands associated with a presented content stream, and transmit, via networks 1008, the navigation commands to the service provider computers 1014.

The architecture 1000 may also include one or more service provider computers 1014 that may, in some examples, provide computing resources such as, but not limited to, client entities, low latency data storage, durable data store, data access, management, virtualization, hosted computing environment or "cloud-based" solutions, electronic content performance management, etc. The service provider computers 1014 may implement or be an example of the service provider computer(s) described herein with reference to FIGS. 1-9 and throughout the disclosure. The one or more service provider computers 1014 may also be operable to provide web site hosting, computer application development, content streaming, and/or implementation platforms, combinations of the foregoing, or the like to the one or more users 1002 via user devices 1004.

In some examples, the networks 1008 may include any one or a combination of many different types of networks, such as cable networks, the Internet, wireless networks, cellular networks, and other private and/or public networks. While the illustrated examples represents the users 1002 communicating with the service provider computers 1014 over the networks 1008, the described techniques may equally apply in instances where the users 1002 interact with the one or more service provider computers 1014 via the one or more user devices 1004 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.). One or more third party computers 1032 may transmit information to and receive information from the service provider computers 1014 and/or the user devices 1004 via networks 1008. The one or more third part computers 1032 may provide advertisements, recommendations, or other content such as images, videos, text, etc., to the service provider computers 1014 and/or the user devices 1004. The one or more third party computers 1032 may include content provider computers associated with content providers. Content generated by the content providers may be provided directly to the user device 1004, via networks 1008, by the one or more third party computers 1032 in response to input provided by users 1002 interacting with user device 1004 and/or instructions from the service provider computers 1014.

The one or more service provider computers 1014 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1014 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1014 may be in communication with the user device 1004 via the networks 1008, or via other network connections. The one or more service provider computers 1014 may include one or more servers, perhaps arranged in a cluster or as individual servers not associated with one another.

In one illustrative configuration, the one or more service provider computers 1014 may include at least one memory 1016 and one or more processing units or processor(s) 1018. The processor(s) 1018 may be implemented as appropriate in hardware, computer-executable instructions, firmware, or combination thereof. Computer-executable instruction or firmware implementations of the processor(s) 1018 may include computer-executable or machine-executable instructions written in any suitable programming language to perform the various functions described when executed by a hardware computing device, such as a processor. The memory 1016 may store program instructions that are loadable and executable on the processor(s) 1018, as well as data generated during the execution of these programs. Depending on the configuration and type of the one or more service provider computers 1014, the memory 1016 may be volatile (such as RAM) and/or non-volatile (such as ROM, flash memory, etc.). The one or more service provider computers 1014 or servers may also include additional storage 1020, which may include removable storage and/or non-removable storage. The additional storage 1020 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1016 may include multiple different types of memory, such as SRAM, DRAM, or ROM.

The memory 1016, the additional storage 1020, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1016 and the additional storage 1020 are all examples of non-transitory computer storage media. Additional types of non-transitory computer storage media that may be present in the one or more service provider computers 1014 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1014. Combinations of any of the above should also be included within the scope of non-transitory computer-readable media.

The one or more service provider computers 1014 may also contain communication connection interface(s) 1022 that allow the one or more service provider computers 1014 to communicate with a data store, another computing device or server, user terminals, and/or other devices on the networks 1008. The one or more service provider computers 1014 may also include I/O device(s) 1024, such as a keyboard, a mouse, a pen, a voice input device, a touch input device, a display, speakers, a printer, etc.

Turning to the contents of the memory 1016 in more detail, the memory 1016 may include an operating system 1026, one or more data stores 1028, and/or one or more application programs or services for implementing the features disclosed herein including the content stream generation module 1030. In accordance with at least one embodiment, the content stream generation module 1030 may be configured to at least maintain data assets that include video segments associated with content provided by content providers. In embodiments, the content stream generation module 1030 may be configured to generate a content stream that includes the video segments, receive input or data from user device 1004 that corresponds to various navigation commands, interpret the input from the user device 1004, and generate content including full videos, product details, links to web pages for items or services, launching of applications associated with one or more content providers, or other functions associated with the content generation feature. In accordance with at least one embodiment, the content stream generation module 1030 may be configured dynamically update a content stream by removing video segments or adding new video segments to the content stream based on input provided by a user 1002 viewing or consuming the content stream or content associated with the content stream.

In embodiments, the content stream generation module 1030 may be configured to obtain and utilize engagement data from users 1002 interacting with particular video segments of a content stream to update the content stream as well as update subsequently generated content streams. The content stream generation module 1030 may utilize engagement data or metrics from the third party computers 1032 to update the content streams. The content stream generation module 1030 may be configured to generate video segments from content provided by content providers by implementing algorithms that identify when audio is detected in the content or faces are recognized in the content. The content stream generation module 1030 may generate the video segments from media associated with a piece of content. For example, a video segment may be generated from a trailer that is associated with a movie or video game. In embodiments, the content stream generation module 1030 may generate the video segments from the content itself such as by selecting certain scenes, clips, audio, etc., to generate the video segment. The content stream generation module 1030 may be configured to use information or metadata from a video segment to include in a function call or API invocation for an application to begin presentation of content provided by a content provider associated with a video segment presented via the content stream in response to receiving input during presentation of the video segment.

Figure 11:
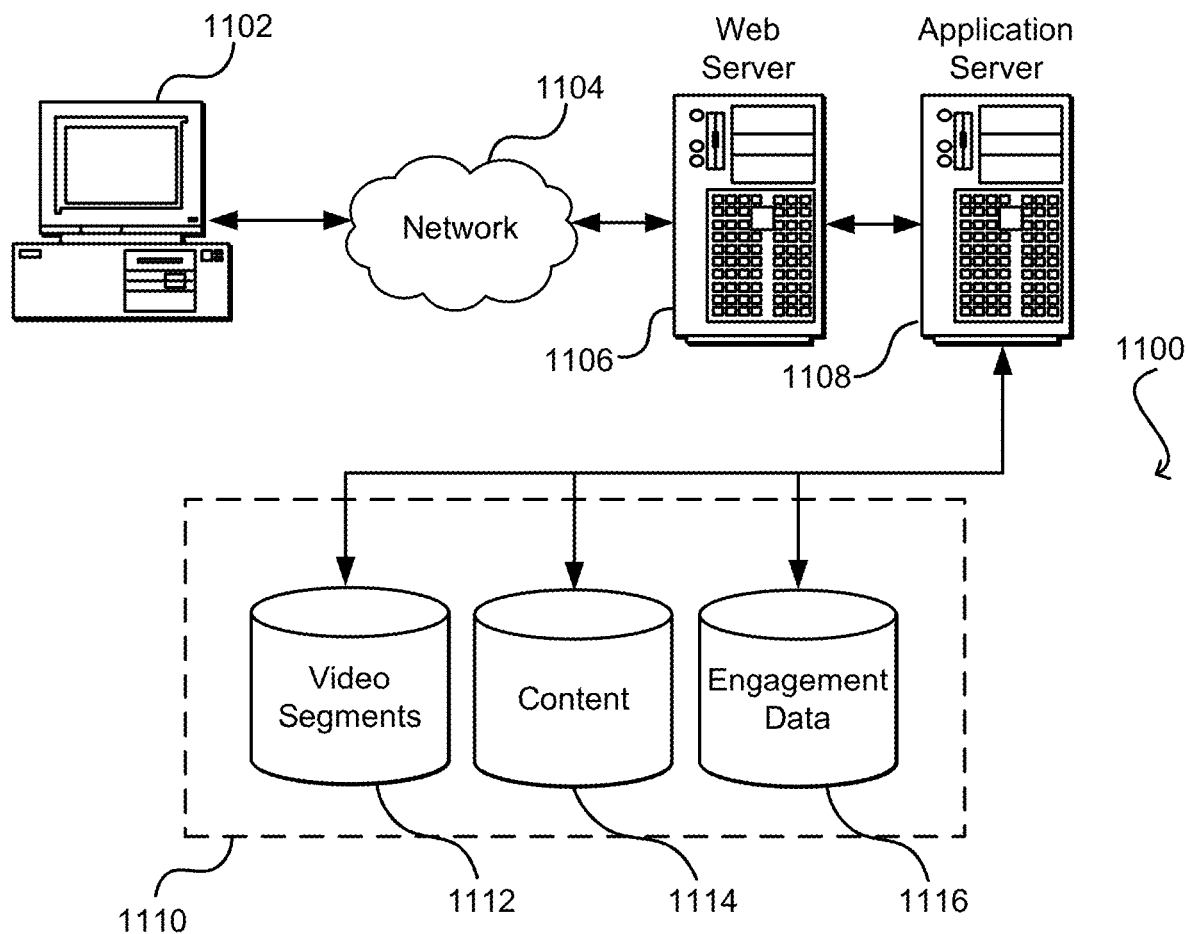
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing video segments 1112 and engagement data 1116, which can be used to serve content for the production side, generate video segments, generate content streams, and update generated video segments, stored video segments, and generated content streams. The data store also is shown to include a mechanism for storing category content 1114, which can be used for reporting, analysis, or other such purposes such as determining whether a user requesting the content has the appropriate permission to consume the content, map the requested content to other systems or applications such as purchase or rental systems, as well as update user profiles for consumed or purchased content. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a content request. In this case, the data store 1110 might access stored user information to verify the identity of the user and can access a catalog of content to obtain information about items or content that correspond to the request. The information and/or content, such as the generated content stream, then can be returned to the user, such as in an application or a Web page that the user is able to view via a browser on the user device 1102.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

maintaining, by a computer system, data assets that correspond to video segments provided by a plurality of content providers, a video segment of the video segments corresponding to a first portion of a full video segment for a piece of content from the plurality of content providers, a data asset of the data assets including metadata that identifies a relationship to the piece of content and information for the piece of content, the video segments including user generated clips previously generated and previously provided to the plurality of content providers;

obtaining, via a user interface of the computer system, first input that corresponds to initiating an application configured to be presented via the user interface;

generating, by the computer system, a content stream based at least in part on the first input, the content stream including different video segments of the video segments provided by the plurality of content providers based at least in part on the data assets and ratings associated with each data asset, and user preferences identified by a user profile, the content stream comprising a streamable presentation of each video segment of the different video segments, and the user preferences specifying content platforms, each content platform of the content platforms offering content from a particular content provider of the plurality of content providers;

presenting, via the application of the computer system and to a user associated with the computer system, the content stream;

receiving, via the application of the computer system, second input during presentation of the content stream, the second input corresponding to a navigation command for displaying a second portion of the full video segment for a particular piece of content of the content stream, the particular piece of content provided by the particular content provider;

transmitting, by the computer system and to another application of the computer system, instructions for integrating presentation of the second portion of the full video segment via the content stream and the user interface in response to receiving the second input, the another application associated with the particular content provider;

presenting, via the application of the computer system, the content stream including the second portion of the full video segment;

receiving, via the application of the computer system, third input during presentation of the second portion of the full video segment, the third input corresponding to a command for storing a particular video segment of the full video segment on a user device associated with the user; and transmitting, by the computer system and to the user device, the particular video segment for storage on the user device.

2. The computer-implemented method of claim 1, further comprising:
receiving, via the application of the computer system, fourth input during presentation of the second portion of the full video segment; and
updating, by the computer system, the application to present the full video segment for the piece of content based at least in part on the fourth input.

3. The computer-implemented method of claim 1, further comprising:
receiving, via the application of the computer system, fourth input during presentation of the second portion of the full video segment; and
updating, by the computer system, the application to enable purchase or rental of the piece of content based on the fourth input.

4. The computer-implemented method of claim 1, further comprising:
receiving, via the application of the computer system, fourth input that corresponds to skipping presentation of the second portion of the full video segment; and
updating, by the computer system, the application to present another video segment of the content stream based at least in part on the fourth input.

5. The computer-implemented method of claim 1, further comprising:
receiving, via the application of the computer system, fourth input that corresponds to navigating to a previously presented video segment of the content stream; and
updating, by the computer system, the application to present the previously presented video segment based at least in part on the fourth input.

6. The computer-implemented method of claim 1, further comprising:
receiving, via the application of the computer system, fourth input that corresponds to navigating to related content associated with the content stream; and
updating, by the computer system, the application to present the related content based at least in part on the fourth input.

7. A non-transitory computer-readable storage medium storing computer-executable instructions that, when executed by a computer system, configure the computer system to perform operations comprising:
maintaining data assets that correspond to video segments provided by a plurality of content providers, a video segment of the video segments corresponding to a first portion of a full video segment for a piece of content from the plurality of content providers, a data asset of the data assets including metadata that identifies a relationship to the piece of content and information for the piece of content, the video segments including user generated clips previously generated and previously provided to the plurality of content providers;
obtaining, via an associated user interface, first input that corresponds to initiating an application configured to be presented via the user interface;
generating a content stream based at least in part on the first input, the content stream including different video segments of the video segments provided by the plurality of content providers based at least in part on the data assets and ratings associated with each data asset, and user preferences identified by a user profile, the content stream comprising a streamable presentation of each video segment of the different video segments, and the user preferences specifying content platforms, each content platform of the content platforms offering content from a particular content provider of the plurality of content providers;
presenting, via the application and to a user associated with the computer system, the content stream;
receiving, via the application, second input during presentation of the content stream, the second input corresponding to a navigation command for displaying a second portion of the full video segment for a particular piece of content of the content stream, the particular piece of content provided by the particular content provider;
transmitting, to another application of the computer system, instructions for integrating presentation of the second portion of the full video segment via the content stream and the user interface in response to receiving the second input, the another application associated with the particular content provider;
presenting, via the application, the content stream including the second portion of the full video segment;
receiving, via the application, third input during presentation of the second portion of the full video segment, the third input corresponding to a command for storing a particular video segment of the full video segment on a user device associated with the user; and
transmitting, to the user device, the particular video segment for storage on the user device.

8. The non-transitory computer-readable storage medium of claim 7, wherein the instructions, when executed by the computer system, further configure the computer system to perform operations comprising:
receiving, via the application, fourth input during presentation of the content stream, the fourth input corresponding to a different navigation command for displaying different content from the plurality of content providers; and
updating the content stream to at least one of remove certain video segments from the content stream or add new video segments to the content stream based at least in part on the fourth input.

9. The non-transitory computer-readable storage medium of claim 7, wherein the instructions, when executed by the computer system, further configure the computer system to perform operations comprising:
receiving, via the application, fourth input during presentation of the second portion of the video segment, the fourth input corresponding to a different navigation command for adding an item associated with the piece of content to a shopping list associated with the user profile.

10. The non-transitory computer-readable storage medium of claim 7, wherein the instructions, when executed by the computer system, further configure the computer system to perform operations comprising:
receiving, via the application, fourth input during presentation of the second portion of the video segment, the fourth input corresponding to a navigation command for adding an item associated with the piece of content to a shopping cart of an online marketplace.

11. The non-transitory computer-readable storage medium of claim 7, wherein the instructions, when executed by the computer system, further configure the computer system to perform operations comprising:

receiving, via the application, fourth input during presentation of the second portion of the full video segment, the fourth input corresponding to a different navigation command for receiving additional information for an item or service associated with the piece of content; and transmitting, to the user device, a hyperlink for accessing a webpage for presenting the additional information for the item or the service associated with the piece of content.

12. The non-transitory computer-readable storage medium of claim 7, wherein the instructions, when executed by the computer system, further configure the computer system to perform operations comprising:

receiving, via the application, fourth input during presentation of the second portion of the full video segment, the fourth input corresponding to a different navigation command for transmitting the second portion of the full video segment to a social media web site associated with the user profile, the user profile associated with the application.

13. The non-transitory computer-readable storage medium of claim 7, wherein receiving the first input includes receiving an audio command via the user device associated with the application.

14. A computer system comprising:
a memory configured to store computer-executable instructions; and
a processor in communication with the memory configured to execute the computer-executable instructions to at least:
maintain data assets that correspond to video segments provided by a plurality of content providers, a video segment of the video segments corresponding to a first portion of a full video segment for a particular piece of content from the plurality of content providers, a data asset of the data assets including metadata that identifies a relationship to the particular piece of content and information for the particular piece of content, the video segments including user generated clips previously generated and previously provided to the plurality of content providers;
obtain, via user interface of the computer system, first input that corresponds to initiating an application configured to be presented via the user interface;
generate a content stream based at least in part on the first input the content stream including different video segments of the video segments provided by the plurality of content providers based at least in part on the data assets and ratings associated with each data asset, and user preferences identified by a user profile, the content stream comprising a streamable presentation of each video segment of the different video segments, and the user preferences specifying content platforms, each content platform of the content platforms offering content from a particular content provider of the plurality of content providers;
present, via an application and to a user associated with the computer system, the content stream;
receive, via the application, second input during presentation of the content stream, the second input corresponding to a navigation command for displaying a second portion of the full video segment for a particular piece of content of the content stream, the particular piece of content provided by the particular content provider;
transmit, to another application, instructions for integrating presentation of the second portion of the full video segment via the content stream and the user interface in response to receiving the second input, the another application associated with the particular content provider;
present, via the application, the content stream including the second portion of the full video segment;
receive, via the application, third input during presentation of the second portion of the full video segment, the third input corresponding to a command for storing a particular video segment of the full video segment on a user device associated with the user; and
transmit, to the user device, the particular video segment for storage on the user device.

15. The computer system of claim 14, wherein generating the content stream is further based at least in part on aggregated data for the video segments.

16. The computer system of claim 14, wherein generating the content stream is further based at least in part on engagement data from the plurality of content providers.

17. The computer system of claim 14, wherein the processor in communication with the memory is further configured to execute the computer-executable instructions to at least:
receive, via the application, fourth input during presentation of the content stream, the fourth input corresponding to a different navigation command for displaying different content from the plurality of content providers; and
update the content stream to at least one of remove certain video segments from the content stream or add new video segments to the content stream based at least in part on the fourth input wherein removing the certain video segments from the content stream is based at least in part on comparing the certain video segments to a particular video segment of the content stream displayed while receiving the fourth input.

18. The computer system of claim 14, wherein the user profile is associated with the application.

\* \* \* \* \*